Nov. 14, 1944.   E. H. LAND   2,362,832
REMOTE CONTROL APPARATUS EMPLOYING POLARIZED
ELECTRO-MAGNETIC RADIATION
Filed Sept. 16, 1940   5 Sheets-Sheet 1

INVENTOR
Edwin H. Land
BY
Donald L. Brown
ATTORNEY

Nov. 14, 1944.  E. H. LAND  2,362,832
REMOTE CONTROL APPARATUS EMPLOYING POLARIZED
ELECTRO-MAGNETIC RADIATION
Filed Sept. 16, 1940  5 Sheets-Sheet 2

INVENTOR
Edwin H. Land
BY
Donald L. Brown
ATTORNEY

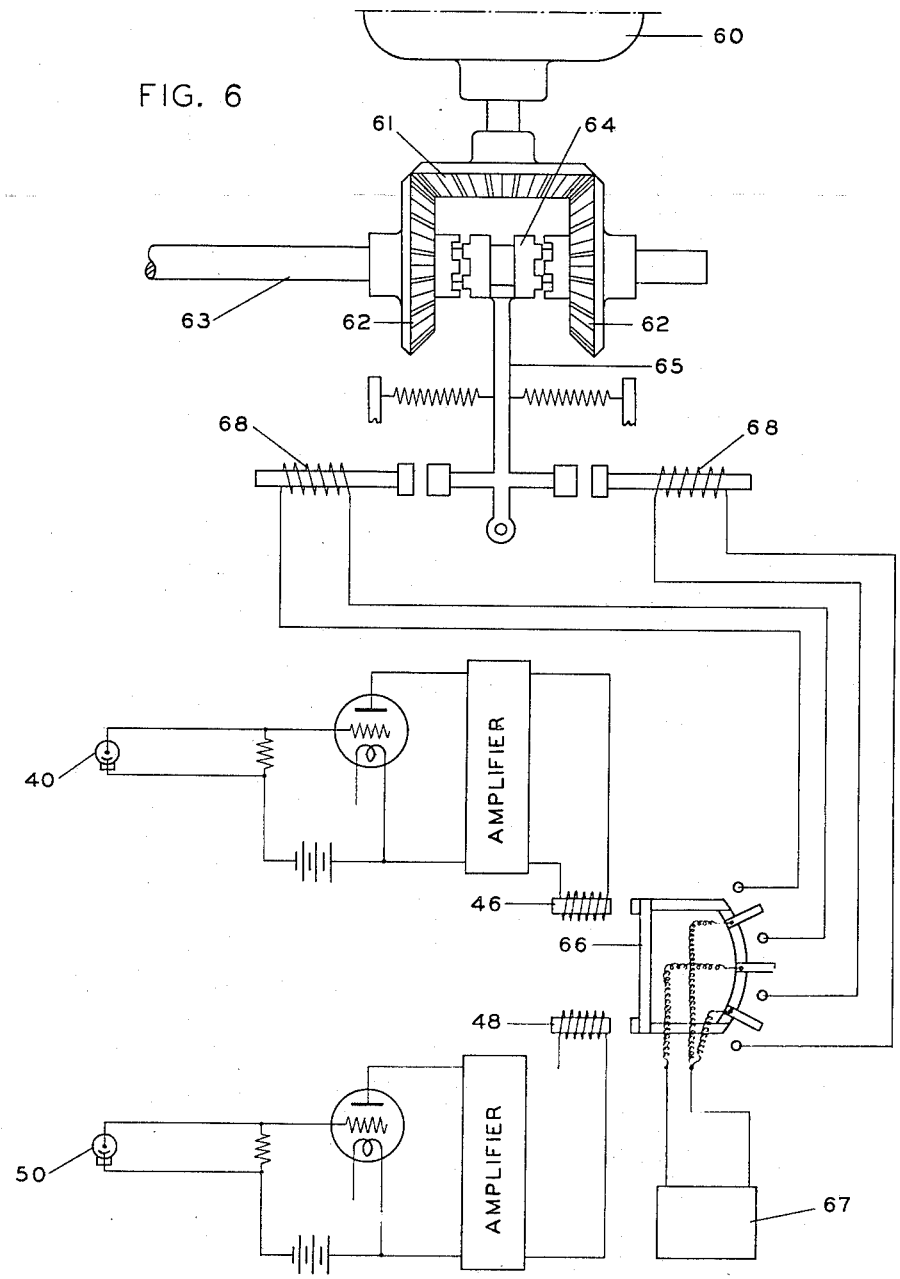

Nov. 14, 1944.  E. H. LAND  2,362,832
REMOTE CONTROL APPARATUS EMPLOYING POLARIZED
ELECTRO-MAGNETIC RADIATION
Filed Sept. 16, 1940  5 Sheets-Sheet 4
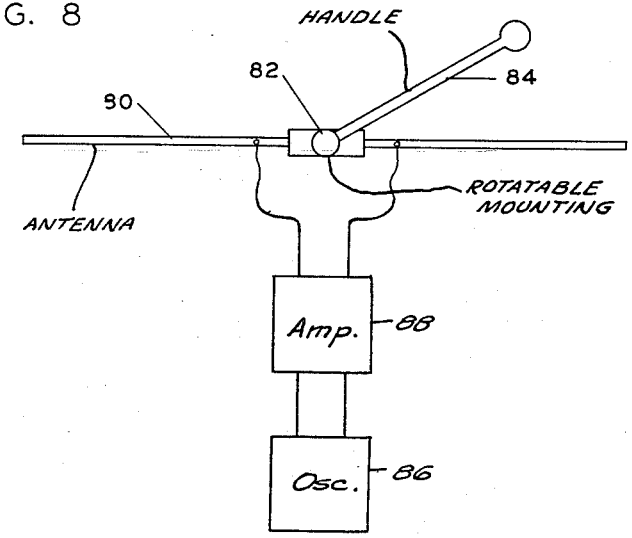
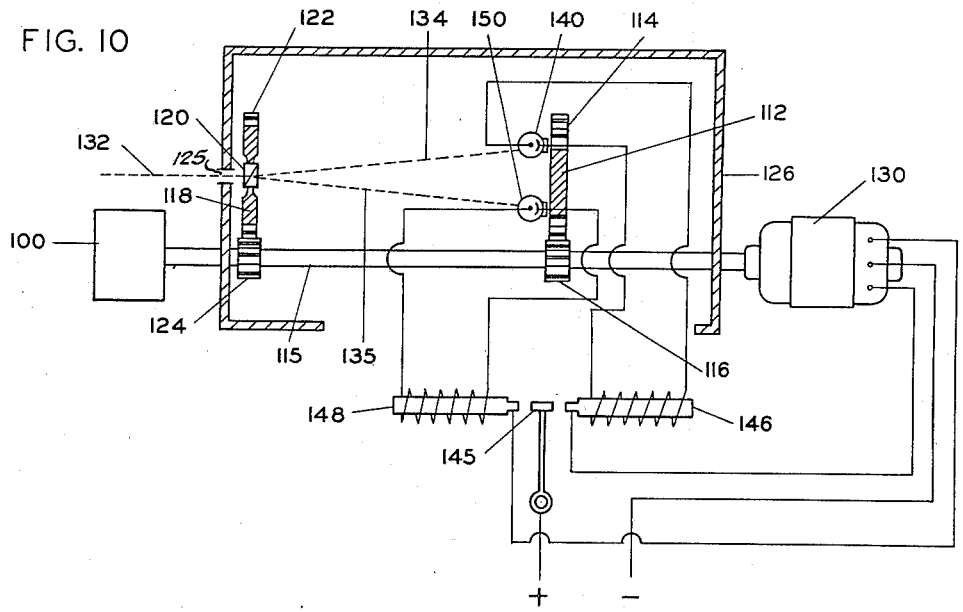

Nov. 14, 1944.   E. H. LAND   2,362,832
REMOTE CONTROL APPARATUS EMPLOYING POLARIZED
ELECTRO-MAGNETIC RADIATION
Filed Sept. 16, 1940   5 Sheets-Sheet 5

INVENTOR.
Edwin H. Land
BY
Donald L. Brown
Attorney

Patented Nov. 14, 1944

2,362,832

UNITED STATES PATENT OFFICE 2,362,832

REMOTE-CONTROL APPARATUS EMPLOYING POLARIZED ELECTROMAGNETIC RADIATION

Edwin H. Land, Cambridge, Mass., assignor to Polaroid Corporation, Dover, Del., a corporation of Delaware Application September 16, 1940, Serial No. 357,035

3 Claims. (Cl. 250—2)

This invention relates to signaling, and more particularly to new signaling apparatus and remote control systems operated by means of polarized electro-magnetic radiation.

A particular object of the invention is the provision of new systems or methods of remote control by means of polarized electro-magnetic radiation in combination with suitably responsive analyzing means, and the provision of suitable apparatus therefor.

Another object of the invention is to provide a method of controlling a relay or similar device from a distance by providing a suitable source of polarized radiation and suitably responsive analyzing means associated with said relay and responsive to variations of the polarization properties of said radiation to control the operation of the relay.

A further object is to provide in a receiving apparatus adapted to be controlled by polarized radiation, analyzers suitably responsive to said polarized radiation but not to unpolarized radiation.

A still further object of the invention is to provide in a receiving apparatus adapted to be controlled by polarized radiation, interpreting means associated with suitable analyzers and rotatable in response to rotation of the direction of vibration of polarized radiation incident thereon.

A still further object is to provide a source of polarized light, means for effecting predetermined variation of the ellipticity of polarization of a beam emanating from said source and receiving means responsive to such variation in polarization of light incident thereon to actuate a relay or similar device.

A still further object is to provide a suitable source of polarized radiation outside of the visible range with means for effecting predetermined variation of the ellipticity of polarization of a beam emanating therefrom, and receiving apparatus responsive to such variation in polarization of waves incident thereon to actuate a relay or similar device.

An additional object is to provide, in combination with means for projecting a beam of polarized radiation and means for rotating the direction of vibration thereof, analyzing means rotatably mounted and adapted to respond promptly to such rotation of the direction of vibration of polarized radiation incident thereon so as to assume and maintain a predetermined position with relation to said direction of vibration.

Other objects and advantages will in part appear and in part be pointed out in the course of the following detailed descriptions of several embodiments of the invention, which are given, as non-limiting examples, in connection with the accompanying drawings, in which:

Figure 6 is a more detailed diagrammatic representation of receiving and interpreting means suitable for incorporation with the apparatus shown in Fig. 4 or Fig. 5;

Fig. 8 is a diagrammatic representation of simple apparatus for emitting a beam of polarized radio waves and controlling the plane of vibration thereof;

Figure 10 is a diagrammatic representation similar to Fig. 4, illustrating receiving and interpreting apparatus embodying a somewhat modified form of the invention.

Figure 1:
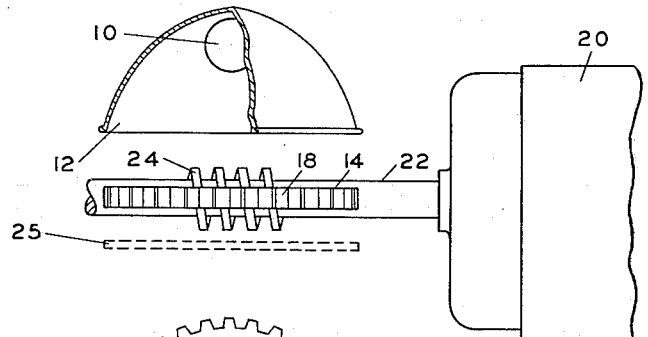
Figure 1 is a plan view, with parts broken away, of simple apparatus for projecting a beam of polarized light suitable for use with certain embodiments of the invention.

This invention contemplates a method or system of remote control, i. e., control from a distance, of such devices as relays, switches and motors. A suitable source of polarized, electromagnetic radiation is provided, which may take the form of means for projecting either a beam of polarized light or other polarized radiation, for example, polarized radio waves. Associated with this source there are provided means for effecting predetermined variation of the polarization properties of the projected beam. Such variation may involve change of the degree of ellipticity of polarization, rotation of elliptically polarized radiation, or in the preferred form of plane polarization, rotation of the vibration direction. It may include any combination of such changes and variation.

The receiving apparatus comprises essentially means sensitive to such variations in the polarization properties of incident radiation and interpreting means responsive to activation of the sensitive means. In the case of plane polarized light, for example, the receiving apparatus may comprise a plurality of photoelectric cells, a plurality of angularly positioned analyzers so placed as to intercept the polarized beam before it strikes the cells, and interpreting means coupled to the cells for equalizing their output. Such interpreting means may comprise, for example, means adapted to cause rotation of the analyzers until the output of the cells has been equalized, or means adapted to cause an alteration in the resistances in circuit with the cells until their output has been equalized. The operation of the interpreting means may be caused to actuate any other desired device, such as a relay, a switch or a motor. Several forms of apparatus suitable for accomplishing the above results are illustrated in the drawings and described in detail hereinafter.

Figure 2:
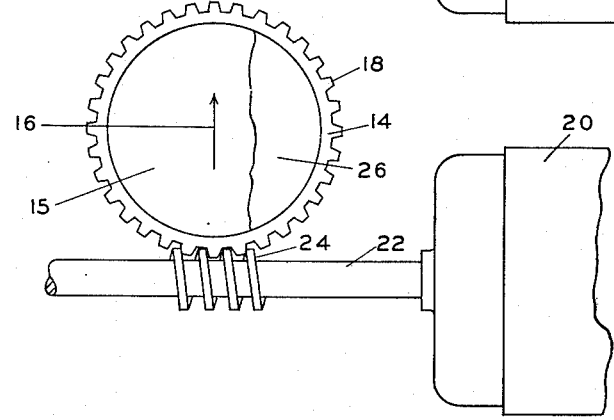
Figure 2 is a front view of the apparatus shown in Fig. 1.

Figs. 1 and 2 illustrate simple apparatus for projecting and controlling a beam of polarized light suitable for use in the practice of this invention. Light source 10 is provided with any desired focusing means such as reflector 12. Positioned in the path of the light beam emanating from source 10 is a polarizing element 15, which may comprise any suitable light-polarizing material, for example, a sheet of an oriented suspension of polarizing particles in a transparent plastic, such as the material sold under the trade name "Polaroid," which is shown as mounted in a suitable rim 14. The polarizing axis of polarizer 15 is indicated by arrow 16, and means are provided for rotating said polarizer in order to effect predetermined rotation of the vibration direction of the beam transmitted thereby. As shown they comprise motor 20, driving a shaft 22 provided with a worm gear 24 adapted to engage teeth 18 on rim 14 of the polarizing element. By means of this arrangement it is possible to impart any desired predetermined degree of rotation to the vibration direction of the beam of polarized light transmitted by polarizer 15, but it will be obvious that many other suitable means for accomplishing the same result may be substituted therefor, either manually operable or otherwise.

It may additionally be noted that, under some conditions, improved results may be obtained by interrupting said beam in order to induce a fluctuating current in the receiving apparatus, although said alternation in the beam may be at so high a frequency that the beam will appear continuous.

The apparatus described above is limited in operation to plane polarized light, but the invention contemplates the use of all other degrees of elliptically polarized light in addition to the special case of plane polarization. For example, there may be added to the apparatus described above, a fractional wave retardation device such as a quarter-wave plate positioned, as indicated by dotted lines at 25 in Fig. 1, in the path of the polarized beam transmitted by polarizer 15. In this case, as polarizer 15 is rotated, the beam transmitted by element 25 will change from plane-polarized light when the polarizing axis of polarizer 15 is parallel to one of the principal optical axes of element 25, through progressively varying degrees of ellipticity until it becomes circularly polarized when the polarizing axis of element 15 is at 45° to the axes of element 25, and then back to plane polarized light at the end of 90° of rotation, and so on. The same result will be achieved by rotatably mounting element 25 in place of polarizer 15 and mounting the polarizer in fixed position between element 25 and light source 10.

A more generally useful and versatile arrangement than any of those described above is to mount a wave retardation device such as a quarter-wave plate in rim 14 in conjunction with and in front of polarizer 15, as indicated at 26 in Fig. 2. Preferably polarizer 15 and element 26 will be so mounted in the rim that each may be rotated therein independently of the other. In this way, either may be rotated relatively to the other in order to achieve any of the effects described above in connection with element 25, or they may be set at any desired relative position and then rotated as a unit by means such as motor 20. It should be noted that the invention includes all such means for varying the ellipticity of polarization of electromagnetic radiation, and that when the term "elliptically polarized light" is used, it is intended to include both plane polarized light and circularly polarized light, which are understood to be special cases of elliptically polarized light. It is believed that the importance of this use of elliptically polarized light will be more easily understood in connection with the description of the receiving and interpreting apparatus of the invention.

Figure 3:
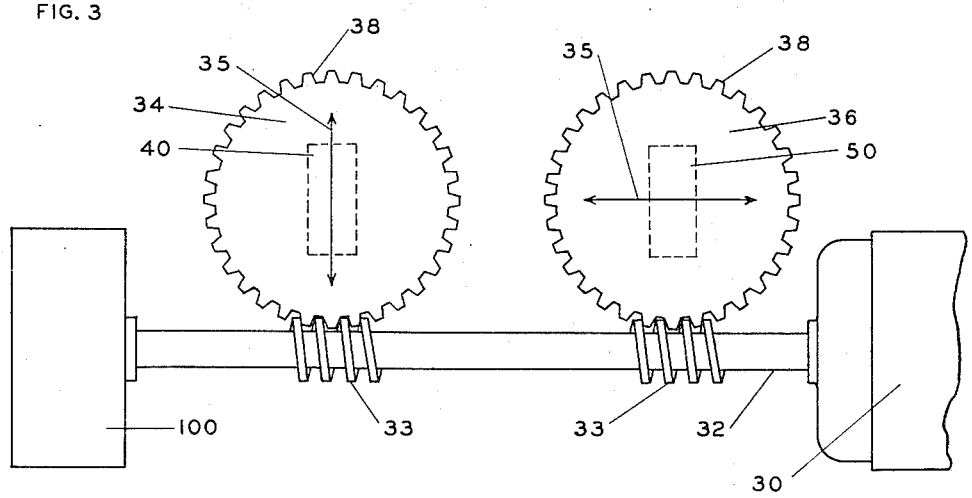
Figure 3 is a front view of simple analyzing apparatus for use in combination with suitable interpreting means in conjunction with the sending apparatus shown in Figs. 1 and 2.

In Fig. 3 there is illustrated simple analyzing apparatus suitable for use in combination with the sending apparatus described above. It comprises essentially a pair of rotatably mounted elements 34 and 36 of polarizing material, provided with means for controlling their rotation. Said means include shaft 32 driven by motor 30 and provided with worm gears 33 adapted to engage teeth or cogs 38 on the rims of each of said analyzing elements 34 and 36. Analyzers 34 and 36 are preferably oriented with their respective polarizing axes at right angles to each other, as indicated by arrows 35, and preferably retain this relation during rotation, as by having the same number of teeth 38 on each of their rims. Dotted lines 40 represent a photoelectric cell mounted behind analyzer 34, and dotted lines 50 represent a second photocell mounted behind analyzer 36. Photocells 40 and 50 are connected with motor 30 through a circuit adapted to keep their respective outputs in balance, as by keeping equal the light incident thereon. In the case of plane polarized light falling on both of said analyzers, it will be seen that such a condition of balance and equal illumination will result when the vibration direction of said light is at an angle of 45° to both arrows 35 and hence both analyzers transmit the same amount of light to their respective photocells.

Such a circuit is preferably so designed that when the vibration direction of said incident light is rotated, thus causing one of said analyzers to transmit more light than the other, the circuit will be thrown out of balance, and motor 30 will be operated to cause rotation of the analyzers until their polarizing axes are again at equal angles with the vibration direction of the light incident thereon and the circuit is thus restored to balance. It is an object of the invention preferably to provide such circuit and interpreting means that when the vibration direction of the incident light is rotated in one direction, as by rotation of polarizer 15 in Figs. 1 and 2, the motor will be actuated to rotate the analyzers in the same direction, for example clockwise, and when the vibration direction is rotated in the opposite direction, the motor will be actuated to rotate the analyzers also in that direction, in this case counter-clockwise. Any desired additional apparatus may be provided adapted to be driven by said motor during its said operation of balancing the analyzers, as is indicated at 100, for example.

Figure 4:
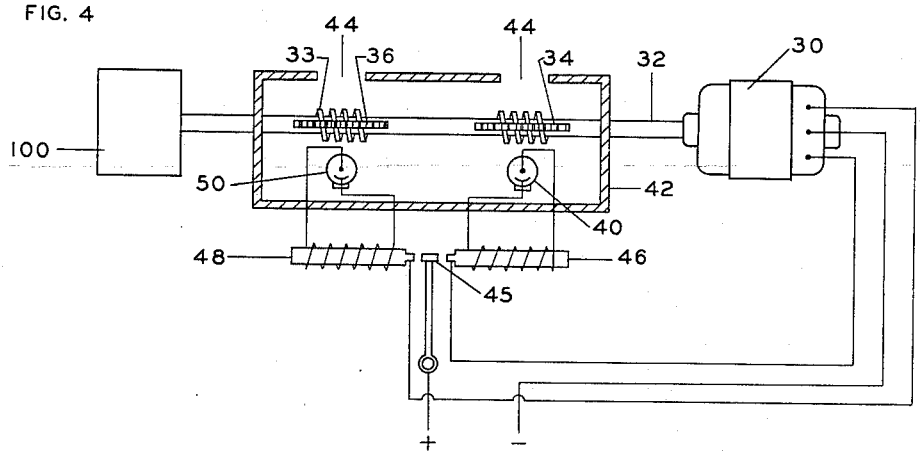
Figure 4 is a diagrammatic representation of a complete receiving and interpreting unit suitable for the practice of the invention and embodying the analyzing means illustrated in Fig. 3.

In Fig. 4 there is illustrated diagrammatically a receiving and interpreting unit capable of accomplishing the above results and including analyzing means of the type shown in Fig. 3 and described above. Said analyzing means are illustrated as enclosed in a box or case 42 provided with a pair of front apertures 44, one before each of analyzers 34 and 36. The object of this arrangement is to guard against the introduction of extraneous light into the system and to cause equal portions of the polarized beam to fall on each of the analyzers. It will be obvious that many other such arrangements may be devised for the same purpose and are to be construed as falling within the scope of the invention. Photocells 40 and 50 are each connected to one of a pair of electromagnets 46 and 48 which, together with a suitable switch arm 45 comprise a relay responsive to any differences between the current outputs of said cells. Arm 45 is connected to one pole of a suitable source of power, and magnets 46 and 48 are each connected to a pole of three-phase motor 30.

It is believed that the operation of this apparatus will now be apparent. So long as the light incident on each of cells 40 and 50 remains equal, due to the polarizing axes of analyzers 34 and 36 being at equal angles with the vibration direction of the beam incident thereon, relay 45 remains open, and motor 30 does not operate. If now the vibration direction of said beam is rotated as described above, so that the light is vibrating in a direction which is at an angle of less than 45° to the polarizing axis of one of said analyzers, say analyzer 34, said analyzer will transmit more light than analyzer 36, whose polarizing axis will then be at an angle of more than 45° to the vibration direction of said beam. Photocell 40 will then receive more light than photocell 50, which will increase its current output and throw the circuit out of balance. Magnet 46 will be energized more than magnet 48 and will attract switch 45, thus closing the relay and starting motor 30, which in turn will act to rotate the analyzers until they again transmit equal amounts of light and so restore the circuit to balance. If, however, in the above case, the vibration direction of said beam had been rotated in the opposite direction, the converse of the above operation would take place, magnet 48 would act to close the relay, and motor 30 would be caused to rotate in the opposite direction to balance the circuit as before.

It will accordingly be seen that by means of interpreting means such as that described above, analyzers 34 and 36 may be caused to rotate at will in either clockwise or counter-clockwise direction, and that in this operation a beam of polarized light may be used to actuate any desired other apparatus at any desired distance, being limited only by the limits of distance to which such a beam of polarized radiation may be projected and received. It will, of course, be understood that only the elements essential to the explanation of the invention are shown in Fig. 4, and that any other elements desirable for improved operation are intended to be included and may be added without departing from the scope of the invention.

It will be understood that many modifications of the above system may be made without departing from the scope of this invention. For example, any of the modified types of sending apparatus described above may be used, and in such case it is only necessary to use complementary analyzing means. If a polarizer and quarter-wave plate are used to vary the polarization properties of the projected beam, the analyzers should be of the same construction but should have their component elements mounted in the reverse order in the path of the beam, that is, the polarizing element should always be adjacent the photocell. It is possible in this way to obtain extreme secrecy in the system, as by using in the sending apparatus a rotating polarizer and quarter-wave plate set with their axes at such a relative angle that the projected beam is almost circularly polarized. With such an arrangement, unless the analyzing polarizers and their associated quarter-wave plates are set at the same relative angles, the interpreting means will not respond accurately to rotation of the beam, thus making exceedingly difficult the detection or interception of the signals transmitted thereby.

It should be noted that the operation of the above described system is not affected by the introduction therein of extraneous, unpolarized light. Regardless of the specific analyzers used, each will transmit the same amount of unpolarized light as the other, and so the balance of the circuit remains unaffected, unless one analyzer receives more extraneous light than the other. This latter condition may be guarded against in a number of ways, and a suitable set-up for this purpose is shown in Fig. 10.

In Fig. 10, photocells 140 and 150 are shown as mounted on a web 112 provided with gear teeth 114 adapted to engage gear 116 on a shaft 115 driven by a motor 130. In place of the separate analyzers shown in Fig. 4, there is illustrated a double image prism 120; such, for example as a Wollaston prism. Prism 120 is shown as mounted on a web 118 provided with gear teeth 122 adapted to engage gear 124 on shaft 115. Teeth 114 and 122 should be equal in number, and gears 116 and 124 should similarly have the same number of teeth. Prism 120 is preferably mounted closely adjacent aperture 125 in surrounding case 126. Photocells 140 and 150 are each connected, as in Fig. 4, to one of the pair of electromagnets 146 and 148 which, together with switch arm 145, comprise a relay adapted to operate motor 130.

The operation of this apparatus is similar to that of the apparatus shown in Fig. 4. An incident beam of polarized light 132 is resolved by prism 120 into a pair of components 134 and 135. Prism 120 and photocells 140 and 150 are initially so positioned that one of said components will be directed against one photocell, and the other of said components against the other photocell. If the direction of vibration of beam 132 is more nearly parallel to one axis of the prism than the other said axis, then one of components 134 and 135 will be stronger than the other. Accordingly, one photocell will receive more light than the other, and the system will be thrown out of balance. As a result, switch 145 will be closed and motor 130 will be caused to operate to rotate the apparatus until both axes of the prism make equal angles with the vibration direction of beam 132. As is mentioned above, during this operation shaft 115 may be caused to do any other desired work, as is indicated at 100.

It will be seen from the above that when beam 132 comprises only polarized light, then the operation of the system is substantially the same as that of the apparatus shown in Fig. 4. The particular advantage of this apparatus, however, is that if beam 132 includes some extraneous unpolarized light, said light will also be resolved into two components, each of which will at all times be equal to the other. It follows, therefore, that the presence of unpolarized light will not upset the balance of the system and that the apparatus shown in Fig. 10 will be responsive only to unequal division between the photocells of the polarized incident light, and therefore that it will operate equally well even if a substantial amount of unpolarized light is present.

Figure 5:
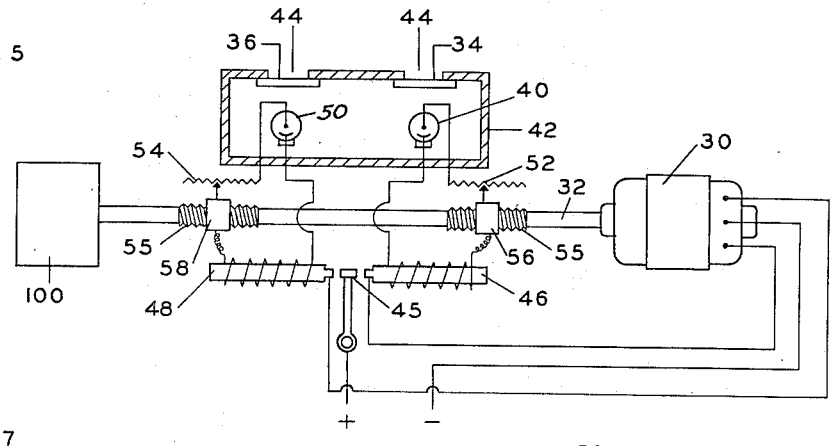
Figure 5 is a view similar to Fig. 4, showing somewhat diagrammatically a modified form of receiving and interpreting unit constructed in accordance with the invention.

Fig. 5 illustrates diagrammatically a modified form of receiving and interpreting apparatus wherein the analyzing elements are stationary and the outputs of the photocells are balanced electrically. Connected in circuit with each photocell and its associated magnet is a variable resistance, such as 52 and 54, and which may, for example, include as the variable element a sleeve 56, 58 threaded on but insulated from the worm or threaded portions 55 of shaft 32. Analyzing elements 34 and 36 are fixedly positioned before their associated photocells and are preferably oriented with their respective polarizing axes at right angles to each other. It will be seen that, as in the above case, when the light incident on each cell is equal, provided the circuit is initially properly balanced, the outputs of the cells will remain equal and relay 45 will remain open. If the vibration direction of a polarized beam incident on analyzers 34 and 36 is rotated, this results in unequal illumination of the two cells, with resulting inequality in their outputs, and this will cause relay 45 to be closed in the manner described above. When the relay is closed, motor 30 will be actuated to rotate shaft 32 and change the relative positions of sleeves 56 and 58 with respect to their associated resistance elements, thus compensating for the inequality in the outputs of the two cells and again returning the circuit to balance. During this balancing operation, motor 30 may also be caused to do any other desired work as indicated at 100 and described above in connection with Fig. 3. It must be understood that the apparatus shown in Fig. 5 is intended as illustrative only of a large class of circuits and devices capable of accomplishing the above results in response to variation in the polarization properties of light incident on photoelectric cells.

In Fig. 6 there is shown in more detail a circuit arrangement suitable for use with systems such as those shown in Figs. 4 and 5. In this arrangement, motor 60 is represented as rotating constantly and provided with a reversible clutch assembly comprising driving gear 61, driven gears 62 rotating freely on shaft 63, and sliding dog 64, which may, for example, be splined on shaft 63 and is controlled by pivoted shifting fork 65. When one of photocells 40 and 50 is activated more than the other, one of magnets 46 and 48 will be energized as described above and will actuate double-throw switch 66 to close the circuit between current source 67 and one or the other of electromagnets 68, thus energizing the latter to attract fork element 65 and thereby cause dog 64 to engage one or the other of gears 62 and so produce rotation in one direction or the other of shaft 63. Shaft 63 in turn may be connected in any suitable way to means of the above-described type for equalizing the outputs of the photocells and simultaneously doing any other desired work.

Figure 7:
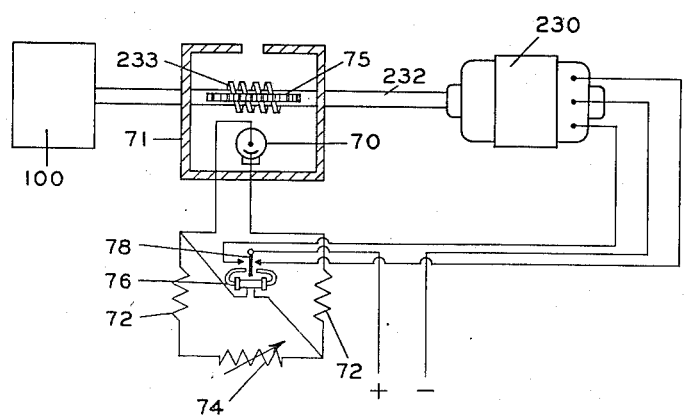
Figure 7 is a somewhat diagrammatic representation of receiving and interpreting apparatus similar to that shown in Fig. 4 but employing only a single photoelectric cell.

In Fig. 7 there is illustrated receiving and interpreting apparatus similar to that shown in Fig. 4 but utilizing only a single photoelectric cell. Cell 70 is represented as being properly shielded in a suitable enclosure 71 and has in front thereof an analyzer 75 similar to those shown in Fig. 3 and similarly rotatably mounted. The rotation of analyzer 75 is controlled by motor 230 through shaft 232 and worm 233, as is described above in connection with Figs. 3 and 4. Photocell 70 is connected in a balanced circuit comprising fixed resistance 72, variable resistance 74, and polarized relay 76. Operating switch arm 78 is connected to a source of current. To achieve maximum sensitivity, variable resistance 74 is preferably so adjusted that the circuit is in balance when the intensity of the light incident on cell 70 is at its midpoint, which, in the case of plane polarized light, will be when the vibration direction of a beam incident on analyzer 75 is at an angle of 45° to the polarizing axis of said analyzer. If then the vibration direction of the incident beam is rotated, the circuit will be unbalanced in one direction or the other, depending on whether the rotation of the beam causes its direction of vibration to become more nearly parallel or more nearly perpendicular to the polarizing axis of analyzer 75. This unbalancing of the circuit will energize relay 76 to close the circuit between switch arm 78 and one of the poles of motor 230, which will in turn operate to rotate analyzer 75 until its polarizing axis is again at an angle of 45° to the vibration direction of the incident beam.

It will be noted that by setting variable resistance 74 as described above, analyzer 75 may be caused to rotate in the same direction as the vibration direction, by suitable arrangement of the circuits to motor 230, in the same way that analyzers 34 and 36 in Fig. 4 follow the direction of rotation of the incident beam. It is equally possible, however, to set variable resistance 74 to balance maximum or minimum output of cell 70, but in this case it will be preferable to use an unpolarized relay at 76, and the apparatus will not indicate in which direction the incident beam is being rotated.

It will be noted that in this apparatus the presence of extraneous, unpolarized light will tend to upset the balance of the circuit, so such light must be excluded as much as possible. It will be apparent that in place of the connection between motor 230 and analyzer 75, the analyzer may be fixed in position and the motor caused to operate variable resistance 74 similarly to the apparatus shown in Fig. 5. It will also be apparent that in either case, any of the above described combinations of polarizing elements and wave retardation devices may be used in combination with this single photocell circuit.

Figure 9:
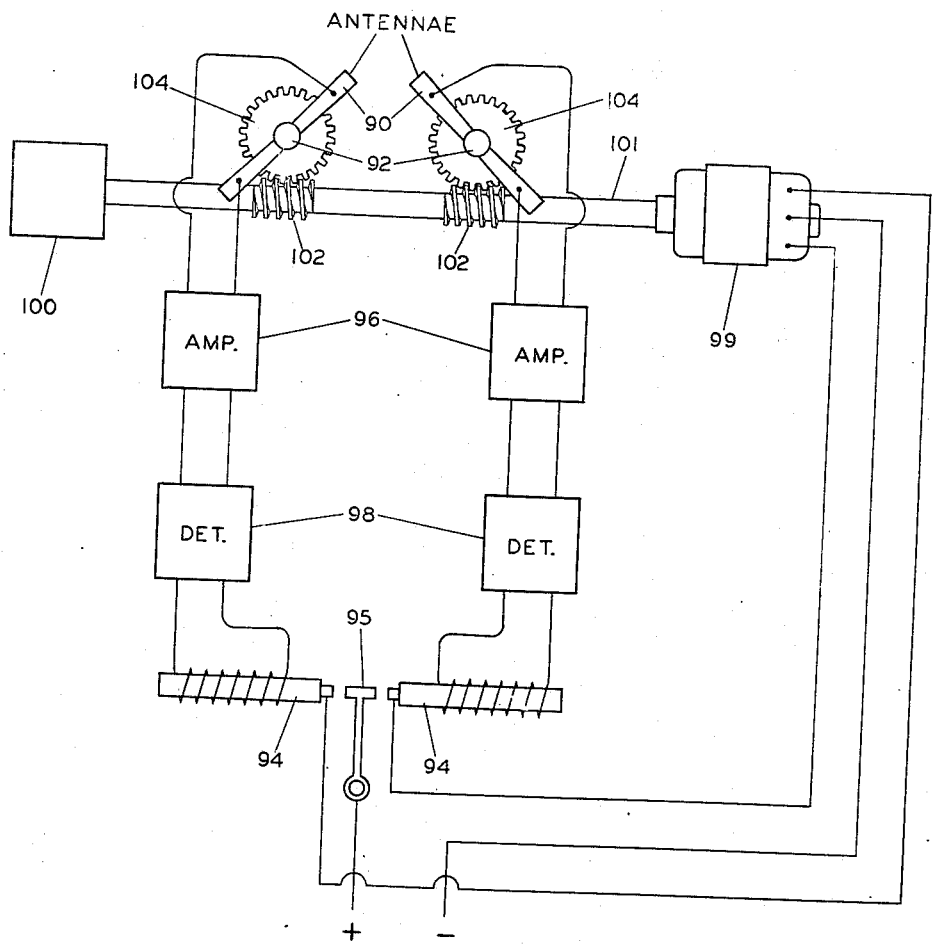
Figure 9 is a diagrammatic representation of receiving apparatus suitable for use in combination with the sending apparatus shown in Fig. 8.

Figs. 8 and 9 illustrate diagrammatically simple apparatus for practicing the invention by means of polarized radio waves. Fig. 8 represents an antenna 80 energized by means of conventional oscillator 86 and amplifier 88 and adapted to emit plane polarized radio waves. Antenna 80 is shown as rotatably mounted at 82 and provided with a handle 84 for controlling its rotation. It will be seen that such rotation of the antenna will impart any desired predetermined degree of rotation to the direction of vibration of the waves emitted therefrom.

The receiving apparatus shown in Fig. 9 is analogous to that shown in Fig. 4 and comprises essentially a pair of antennae 90, mounted on rotatable shafts at 92, and each connected through the usual amplifier and detector units 96, 98 to one of a pair of electromagnets 94 which, together with switch arm 95, constitute a relay which may be energized in much the same way as relay 45 in Figs. 4 and 5. Relay 95 will preferably be employed, as in Figs. 4 and 5, to complete circuits adapted to drive motor 99. As shown in Fig. 9, motor 99 may be geared to antennae 90 through shaft 101 and gears 102 meshing with gears 104 on shafts 92. It will be seen that so long as antennae 90 are energized equally, relay 95 will remain open and motor 99 will not operate. If, on the other hand, one of antennae 90 receives more energy than the other, for example as a result of rotation of antenna 80 in Fig. 8, the relay will close and cause motor 99 to rotate both of antennae 90 until a balance position is again established. During this operation any other desired work may also be done by motor 99 as indicated at 100 and as described above in connection with other embodiments of the invention. It will be understood that other balancing means may be employed, for example, variable resistances as illustrated in Fig. 5. It will be apparent, moreover, that although the above apparatus is adapted for use only with plane polarized radio waves whose direction of vibration is rotated, the invention may be practiced equally well in combination with any other means for varying the polarization properties of radio waves.

It will now be seen that the principles of operation of all the devices and systems described above are substantially the same. In every case a polarized beam, whether it be a beam of polarized light or radio waves or other electromagnetic radiation, is directed upon suitable receiving apparatus, which is thereby caused to assume a condition of balance. The ellipticity of polarization of said beam is then varied to a predetermined degree, which variation results in a destruction of balance in the receiving apparatus and sets into action the means for interpreting this variation, as by producing energization of some rotating mechanism until balance is again restored. Said rotating mechanism is also preferably geared to do any other desired additional work during said balancing operation, and the arrangement may be such that this operation may be repeated as often as desired and in either direction. It will, of course, be obvious that in the exemplifications of the invention shown and described, only the simplest and most elementary set-ups have been employed, and that the invention may be used in far more complex systems and its sensitivity may be greatly increased by the use of additional amplifying and other such devices.

Since certain changes may be made in the above product and different embodiments of the invention could be made without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A remote control system comprising, in combination, means providing a source of polarized radio frequency waves, means for simultaneously projecting said waves in a predetermined path and effecting predetermined variation of the polarization properties of said waves, a plurality of means sensitive to said variations and positioned in the path of said waves in such manner that one of said sensitive means has less than maximum sensitivity to polarized radiation to which the other of said sensitive means has maximum sensitivity, and interpreting means operatively coupled with said sensitive means for maintaining the output of said sensitive means in balance, said interpreting means being responsive to uneven activation of said sensitive means.

2. A remote control system comprising, in combination, a source of polarized radio frequency waves, means for simultaneously projecting said waves in a predetermined path and effecting predetermined rotation of the direction of vibration of said waves, and receiving means comprising a plurality of antenna means positioned in the path of said waves in such manner that one of said antenna means has less than maximum sensitivity to polarized radiation to which the other of said antenna means has maximum sensitivity, and interpreting means operatively coupled with said antenna means for maintaining the output of said antenna means in balance, said interpreting means being responsive to uneven activation of said antenna means.

3. A remote control system comprising, in combination, a source of polarized radio frequency waves, means for simultaneously projecting said waves in a predetermined path and effecting predetermined rotation of the direction of vibration of said waves, and receiving means comprising a plurality of antenna means rotatably mounted in the path of said waves and substantially at right angles to each other, and interpreting means operatively coupled with said antenna means for maintaining the output of said antenna means in balance, said interpreting means being operable in response to uneven activation of said antenna means to cause rotation thereof.

EDWIN H. LAND.